United States Patent
Elko et al.

(10) Patent No.: US 8,341,368 B2
(45) Date of Patent: Dec. 25, 2012

(54) AUTOMATIC REALLOCATION OF STRUCTURED EXTERNAL STORAGE STRUCTURES

(75) Inventors: David A. Elko, Austin, TX (US); Steward L. Palmer, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 12/795,276

(22) Filed: Jun. 7, 2010

(65) Prior Publication Data
US 2011/0302377 A1   Dec. 8, 2011

(51) Int. Cl.
G06G 12/00 (2006.01)
G06F 13/00 (2006.01)
G06F 13/28 (2006.01)
G06F 12/14 (2006.01)
G06F 7/00 (2006.01)
G06F 17/00 (2006.01)

(52) U.S. Cl. ......... 711/163; 711/147; 710/200; 707/704
(58) Field of Classification Search .................. 711/147, 711/154, 163; 710/200; 707/704
See application file for complete search history.

(56) References Cited

U.S. PATENT DOCUMENTS

| | | |
|---|---|---|
| 5,455,946 A | 10/1995 | Mohan et al. |
| 5,581,737 A | 12/1996 | Dahlen et al. |
| 5,742,830 A | 4/1998 | Elko et al. |
| 5,822,562 A | 10/1998 | Dahlen et al. |
| 6,219,772 B1 | 4/2001 | Gadangi et al. |
| 6,237,000 B1 | 5/2001 | Dahlen et al. |
| 6,249,852 B1 | 6/2001 | Benayon et al. |
| 6,449,734 B1 | 9/2002 | Shrivastava et al. |
| 6,584,554 B1 | 6/2003 | Dahlen et al. |
| 6,931,507 B2 | 8/2005 | Kim et al. |
| 7,542,986 B2 | 6/2009 | Lubbers et al. |
| 2005/0138375 A1* | 6/2005 | Sadjadi ........................ 713/167 |
| 2008/0016275 A1 | 1/2008 | Sebastian et al. |

(Continued)

FOREIGN PATENT DOCUMENTS

JP  2005166052 A2  6/2005

OTHER PUBLICATIONS

U.S. Appl. No. 12/795,205, 1 page.

(Continued)

*Primary Examiner* — Jared Rutz
*Assistant Examiner* — Ryan Bertram
(74) *Attorney, Agent, or Firm* — Stephen R. Tkacs; Stephen J. Walder, Jr.; Preston J. Young

(57) ABSTRACT

A mechanism for automatic reallocation of shared external storage structures is provided. The shared external storage divides the dynamically allocable storage into fixed sized blocks referred to as allocation units. To create an object of a specific type, the shared external storage uses some number of allocation units. If the object will fit in one allocation unit, then it is placed in one allocation unit. If the object is larger than one allocation unit, then the appropriate number of allocation units is obtained and chained together to contain all of the information of the required object. When an object so allocated is no longer needed, the shared external storage breaks the object down to a set of one or more fixed sized allocation units. The shared external storage then returns the allocation units to the pool of available objects.

18 Claims, 3 Drawing Sheets

U.S. PATENT DOCUMENTS

2008/0229048 A1 9/2008 Murase et al.
2008/0288646 A1 11/2008 Hasha et al.
2009/0125680 A1 5/2009 Ninose et al.
2009/0132868 A1 5/2009 Chkodrov et al.
2009/0216989 A1 8/2009 Kato et al.
2009/0249018 A1 10/2009 Nojima et al.
2009/0254731 A1 10/2009 Maheshwari et al.
2010/0205374 A1* 8/2010 Meka et al. .................. 711/117

OTHER PUBLICATIONS

Nawrocki, Jerzy R. et al., "Fixed-Sized Blocks Optimization", Information Processing Letters (Inf Process Lett), Dec. 1, 1988, CODEN: IFPLA, ISSN: 0020-0190, Item Identifier (DOI): 10.1016/0020-0190(88)90055-5, 1988, 29/4, pp. 165-169.

* cited by examiner

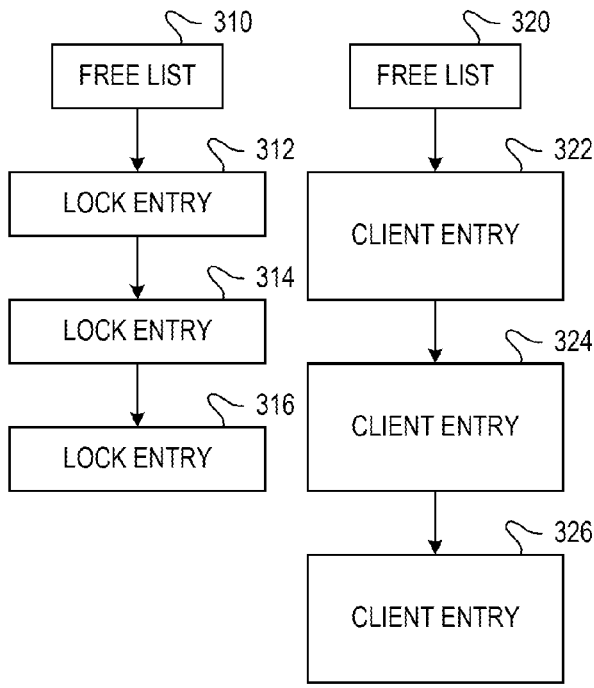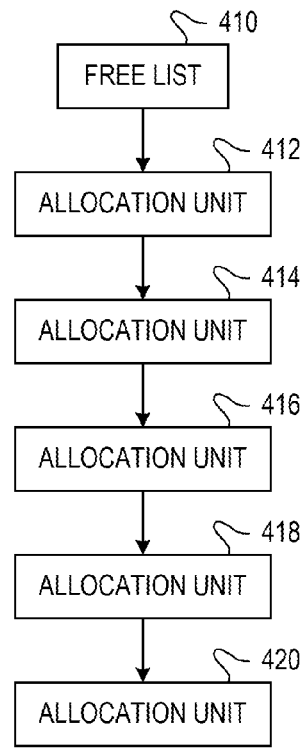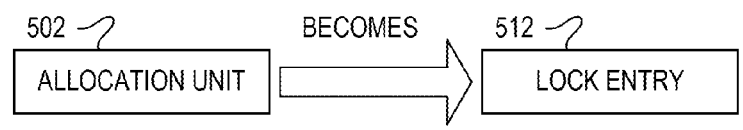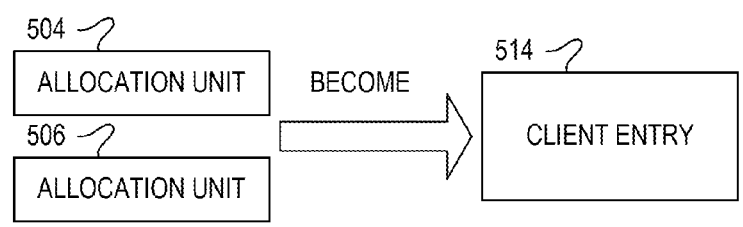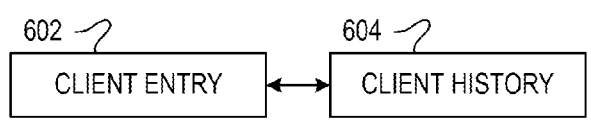

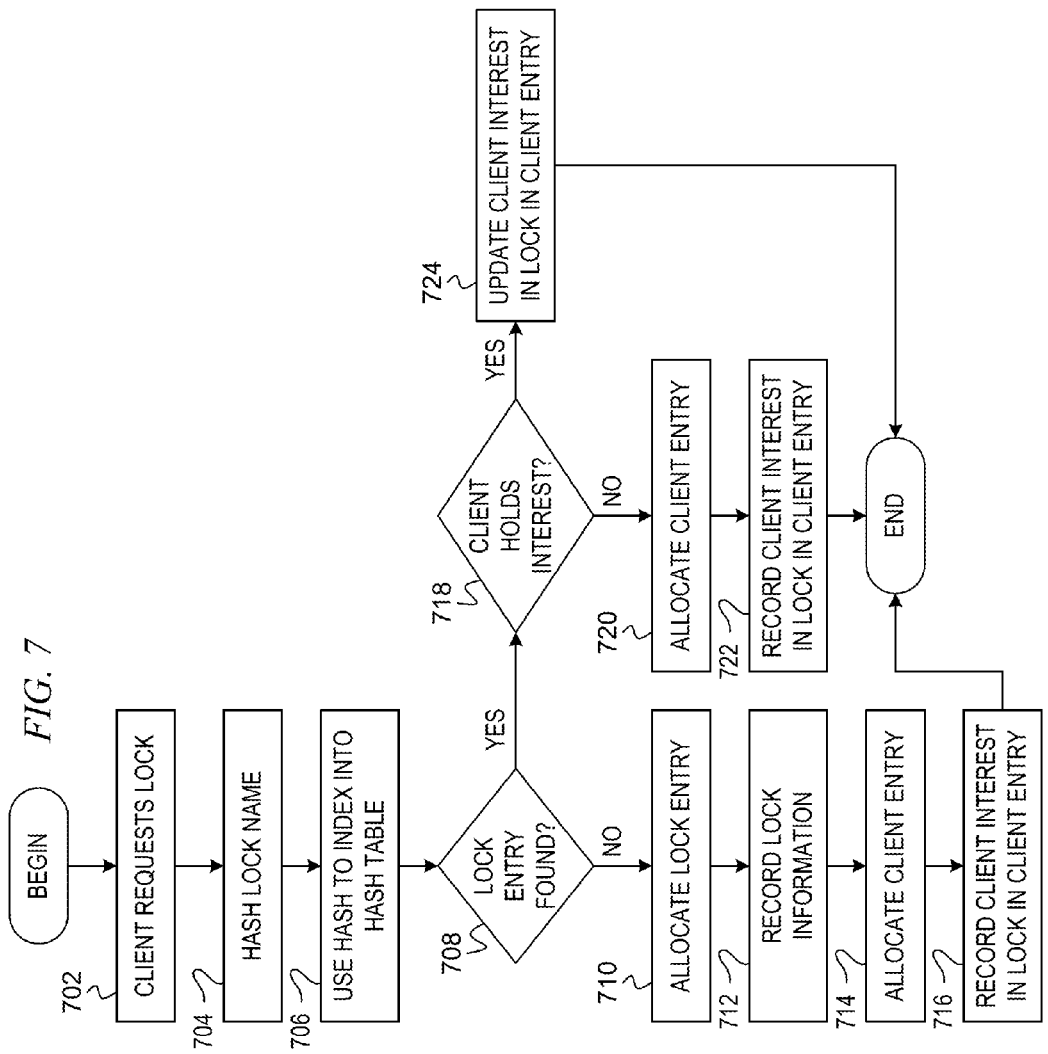

AUTOMATIC REALLOCATION OF STRUCTURED EXTERNAL STORAGE STRUCTURES

BACKGROUND

The present application relates generally to an improved data processing apparatus and method and more specifically to mechanisms for automatic reallocation of shared external storage structures.

Over the years, computer manufacturers have provided processing architectures based on a multi-system shared data approach. Through these architectures, multiple large-scale computer systems, each of which is often referred to as a computer processing complex (CPC) or a central electronic complex (CEC), are interconnected through a shared external storage (SES), which may also be referred to as a shared electronic storage or structured external storage, or another inter processor communication mechanism, to permit each system to gain read/write access to data residing on one or more shared input/output devices.

A coupling facility (CF), aka SES, provides a structured storage for connecting multiple CPCs to allow efficient interchange of data between multiple physical systems while maintaining coherency of the data across all systems. The coupling facility consists of Infiniband or Ethernet links or similar local area network links, central processing units (CPUs), random access memory (RAM) storage that is accessed by the link adapters and CPUs, and control software running in the CPUs.

A CF structure presents a set of objects maintained on behalf of attaching systems. A structure is similar to a shared file in a direct access storage device (DASD), except that structures are maintained in the coupling facility's storage. The CF receives commands from attached CPCs via the links, executes the commands, and returns responses over the links. The commands may create, write to, read from, update, or delete structures on behalf of the attached CPCs. In response to certain commands, the CF may notify attached CPCs of state changes in certain structure objects.

There is an important difference between a CF structure and a shared file. Once a program opens a shared file, it may make arbitrary modifications to any part of the file. A CF structure has a structure to it that cannot be corrupted by an attached client. For example, a list structure contains doubly linked lists. If it were stored in a shared file then a program could corrupt the pointers in a list. But since the structure is stored in a CF and the client can only request high level operations on the structure (such as add, move, or delete list entry) such pointer corruptions are not possible.

In addition to maintaining the integrity of the base structure, the CF also does operations atomically. A single command to the CF that updates a data structure operates in such a way that no other client can see any intermediate results of that update. For example, if the operation is to remove an item from one list and put it on another, no other client will be able to observe the structure with the item missing (i.e. after removal from the first list but before the addition to the second list). If the CF did not do operations atomically, then the clients would all have to implement some sort of global locking protocol on top of the CF to make the operations atomic, which would be far less efficient.

SUMMARY

In one illustrative embodiment, a method is provided in a shared external storage device for automatic allocation of shared external storage structures. The method comprises receiving a request from a client. The request requires allocation of one or more objects of one or more of a set of predetermined object types. The method further comprises automatically allocating a portion of the shared external storage structures within the shared external storage device for the one or more objects and creating the one or more objects from the portion of the shared external storage structures.

In other illustrative embodiments, a computer program product comprising a computer useable or readable medium having a computer readable program is provided. The computer readable program, when executed on a computing device, causes the computing device to perform various ones, and combinations of the operations outlined above with regard to the method illustrative embodiment.

In yet another illustrative embodiment, an apparatus is provided. The apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 depicts a free list of lock entries and a free list of client entries in accordance with an illustrative embodiment;

FIG. 4 depicts a free list of allocation units in accordance with an illustrative embodiment;

FIG. 5A illustrates converting an allocation unit into a lock entry in accordance with an illustrative embodiment;

FIG. 5B illustrates converting two allocation units into a client entry in accordance with the example embodiment;

FIG. 6 depicts a client entry comprising a client entry object and a client history object in accordance with an illustrative embodiment; and FIG. 7 provides a flowchart outlining example operations of a shared external storage with automatic reallocation of storage structures in accordance with an illustrative embodiment.

DETAILED DESCRIPTION

The illustrative embodiments provide a mechanism for automatic reallocation of shared external storage structures. In the example embodiments, the shared external storage divides the dynamically allocable storage into fixed sized blocks referred to as allocation units. To create an object of a specific type, the shared external storage uses some number of allocation units. If the object will fit in one allocation unit, then it is placed in one allocation unit. If the object is larger than one allocation unit, then the appropriate number of allocation units is obtained and chained together to contain all of the information of the required object. When an object so allocated is no longer needed, the shared external storage breaks the object down to a set of one or more fixed sized allocation units. The shared external storage then returns the allocation units to the pool of available objects. In this manner, the ratio of object types is consistently changing as objects are created and destroyed. No explicit ratio management is required.

Figure 1:
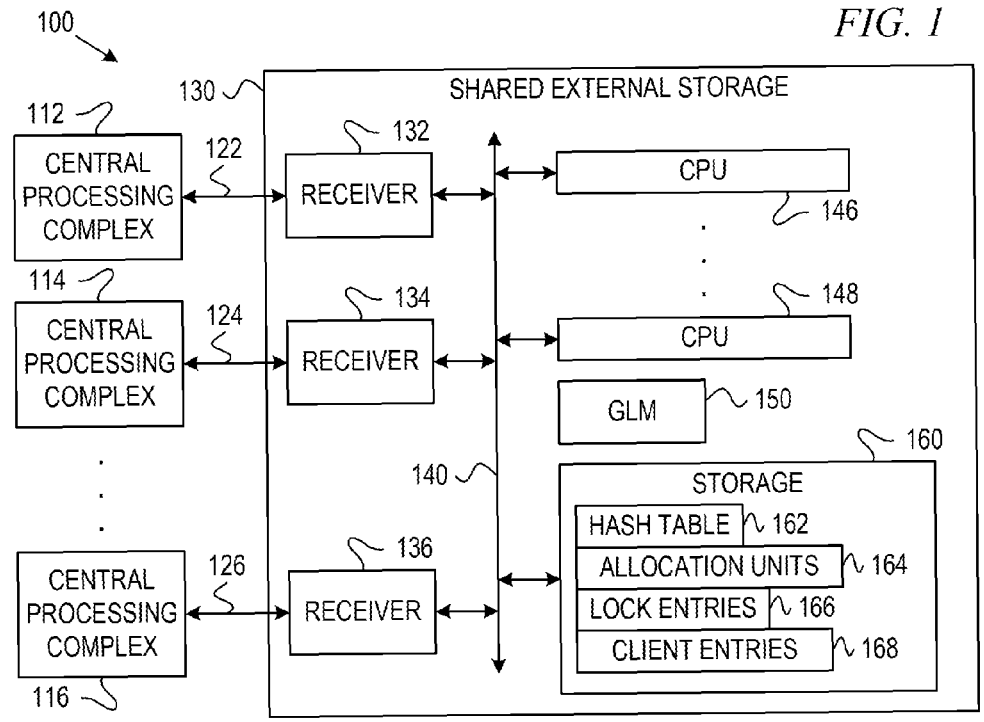
FIG. 1 depicts a pictorial representation of an example distributed data processing system in which aspects of the illustrative embodiments may be implemented.

With reference now to the figures and in particular with reference to FIG. 1, an example diagram of a data processing environment is provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. In FIG. 1, the system 100 includes central processing complexes (CPCs) 112-116 interconnected to shared external storage 130 through respective links 122-126. Each central processing complexes 112-116 may be any architecture having high-speed, low latency links. Each of CPCs 112-116 operates to execute one or more processes that may share data with other ones of the one or more processes executing on the same CPC or a different CPC. The sharing of data by two or more processes is carried out through operation of shared external storage 130.

The shared external storage (SES) 130 includes one or more central processing units (CPUs) 146, 148 and storage 160. SES 130 includes receivers 132-136 that connect to respective ones of the links 122-126. The receivers 132-136, the CPUs 146, 148, and storage 160 interconnect via bus 140. Storage 160 may be, for example, a large storage of data. For instance, storage 160 may be a random access memory (RAM), a flash memory, or some other storage.

Although not illustrated in FIG. 1, storage 160 may store control code for controlling the setup and operation of SES 130, information indicating the locations in storage that are free and hence available for allocation, and one or more work and completion queues for operations to be performed by CPCs 112-116.

One shared external storage produced by IBM is known as the Coupling Facility (CF). The coupling facility may contain two different types of structures: cache structures and list structures. When these structures are allocated, one specifies not only the size of the structure, but also the ratio of object types so that the appropriate number of the correct types of objects may be created. The correct ratios are unpredictable and workload-dependent. Each CPC has a whole infrastructure dedicated to monitoring the existing ratios and sending change commands to the CF in order to keep the ratios correct.

Returning to FIG. 1, according to one illustrative embodiment, SES 130 provides one additional structure type: a lock structure. Unlike prior art shared external storage implementations, SES 130 provides for automatic reallocation of shared external storage structures such that ratio management by the client for lock structures is rendered unnecessary. SES 130 includes a global lock manager (GLM) 150, which uses hash table 162, lock entries 166, and client entries 168 in storage 160 to manage the lock state. GLM 150 may create, write to, read from, update, or delete lock entries and client entries to effect management of the locks. The client asks for a named lock in a particular lock mode. The client is the only entity that knows the external object with which the lock is associated. For example, to lock a row in a database, the client DBMS might construct a lock name that is something like the tablespace number, table number, page, number, and record ID within page.

GLM 150 creates a lock structure. The lock structure comprises some fixed size objects, referred to herein as allocation units 164. Thus, SES 130 divides, this portion of the dynamically allocable storage for the lock structure into allocation units 164. To create an object of a specific type in a lock structure, SES 130 uses some number of allocation units 164. If the object will fit in one allocation unit, then SES 130 places it in one allocation unit. For example, GLM 150 may convert one of allocation units 164 into one of lock entries 166. If the object is larger than one allocation unit, then the appropriate number of allocation units is obtained and chained together to contain all of the information of the required object. For example, GLM 150 may convert two allocation units from allocation units 164 into one of client entries 168.

When an object so allocated is no longer needed, SES 130 breaks the object down to a set of one or more fixed sized allocation units. SES 130 then returns the allocation unit(s) to the pool of available objects. In this manner, the ratio of object types is consistently changing as objects are created and destroyed. No explicit ratio management is required.

Figure 2:
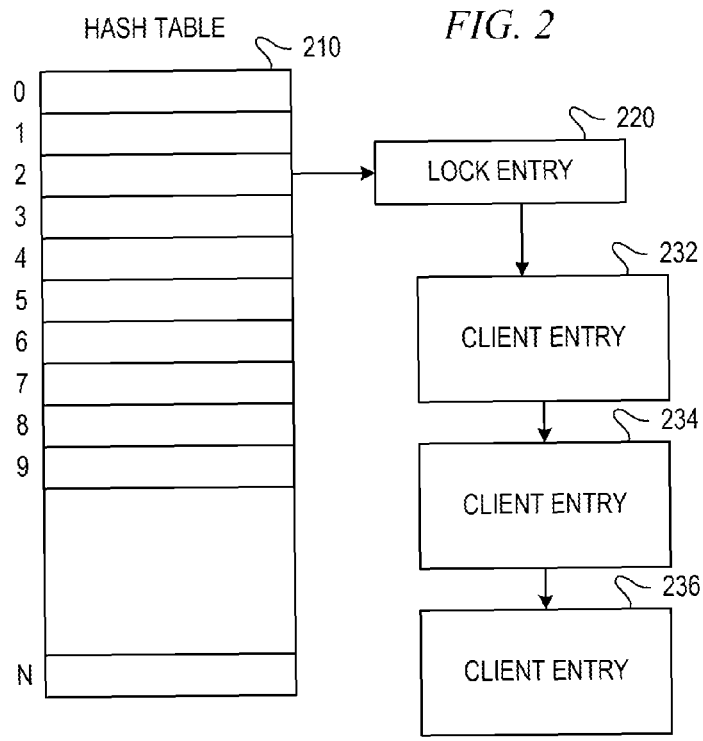
FIG. 2 depicts the data structures required by a global leek manager in accordance with an illustrative embodiment.

FIG. 2 depicts the data structures required by a global lock manager in accordance with an illustrative embodiment. Lock entry object 220 records the existence of a named lock. The global lock manager (GLM) uses hash table 210 to locate a lock entry by name. The GLM hashes the name of lock entry 220, which may be, for example, a 16 byte opaque value, to form an integer using any common hashing algorithm. The GLM then divides the resulting integer by the size of hash table 210 and uses the remainder of this division as the index into hash table 210 to point to lock entry 220.

Lock entry object 220 points to a list of one or more client entry objects 232-236. Each one of client entries 232-236 records the interest of a client of the GLM in the lock corresponding to lock entry 220. The client may be holding the lock, waiting for the lock, or holding the lock in one mode while awaiting an upgrade to a more restrictive mode. Client entries 232-236 record the current state of the clients with respect to the lock. Lock entry 220 and the associated collection of client entries 232-236 together represent the current state of the lock.

Each one of client entries 232-236 contains two different bodies of information. In addition to holding the current lock state for the client, a client entry also holds information about the processing of the most recent request, which is used for problem determination. If a request yields an unexpected response, the history information may be queried to determine why the particular response was received.

The GLM may preserve several client entries per client. For example, the GLM may use the first client entry for a client to hold lock state and use the additional client entries to preserve the sequence of requests and responses that led to a particular lock state. If a client wants to know how a lock came to be in a particular lock state, the client may request the GLM to dump out the entire lock state including all of the historic client entries, which would show the set of requests and responses that led to the current lock state.

The prior art implementation of the coupling facility required that the client specify a ratio of the number of different object types to be allocated. If one were to follow the same pattern when implementing a global lock manager, one would have required the client to specify the ratio between lock entries and client entries so that the appropriate number of each type of object could be allocated. However, this ratio is entirely workload dependent and is difficult to predict. If a set of a dozen clients is using a completely disjoint set of locks, then only one client will be interested in a given lock at any point in time, and the correct ratio between lock entries and client entries would be 1:1. If, however, the clients were all contending for the same set of locks, then on average each lock would have a dozen interested clients and the correct ratio would be 1:12. Furthermore, if the GLM saves additional client entries to track the history of a lock state, the correct ratio could be 1:100 or more.

These patterns of lock reference are in continuous flux. In implementations where the ratios are specified explicitly by the clients, such as with cache and list structures in the prior art coupling facility implementation, there is a whole infrastructure dedicated to continually monitoring ratios and sending change commands to the shared memory in an attempt to keep the ratios correct for the current workload.

Given the direction taken by the prior art coupling facility design in which there is one list of free entries allocated for each object type, the lock structure of the global lock manager may have a free list of lock entries and a free list of client entries. FIG. 3 depicts a free list of lock entries and a free list of client entries in accordance with an illustrative embodiment. Free list head pointer 310 points to a list of free lock entries 312-316. Free list head pointer 320 points to a list of free client entries 322-326.

FIG. 4 depicts a free list of allocation units in accordance with an illustrative embodiment. In this depicted embodiment, rather than having separate lists of allocated objects for the different object types, the shared external storage has a free list of allocation units. Free list head pointer 410 points to a list of free allocation units 412-420 that may be allocated and converted into different object types.

In one example embodiment, when a new lock entry is required, the global lock manager takes one allocation unit, such as allocation unit 420, from free list 410 and turns the allocation unit into a lock entry. FIG. 5A illustrates converting an allocation unit 502 into a lock entry 512 in accordance with the example embodiment. When a new client entry is required, the global lock manager takes two allocation units from free list 410 and creates one client entry from the two allocation units. FIG. 5B illustrates converting two allocation units 504, 506 into a client entry 514 in accordance with the example embodiment.

Conversely, when a lock entry is no longer needed, the global lock manager may turn the lock entry back into an allocation unit and add the allocation unit to free list 410. When a client entry is no longer needed, the global lock manager may turn the client entry back into two allocation units and add the allocation units to free list 410.

The lock entry records the lock name and a small amount of information about the lock. The client entry contains more information. The client entry holds the last request sent by the client and the last response returned by the global lock manager to the client. The client entry is roughly twice the size of the lock entry, which is why it takes two allocation units to make one client entry and only one allocation unit to make a lock entry.

An analysis of the information in the client entry reveals that the client entry may be split into two objects of roughly equivalent size: the client entry object and the client history object. The amount of information in the two client entry objects is still roughly twice the amount of information in the lock entry. However, this information may be contained in two different object types, each of which is roughly the size of the lock entry. This means that the lock entry object, the client entry object (without the history information), and the client history object are roughly the same size, about the size of an allocation unit.

FIG. 6 depicts a client entry comprising a client entry object and a client history object in accordance with an illustrative embodiment. What appears to be a single client entry is actually composed of one client entry object 602 and one client history object 604, which point to each other.

Thus, the shared external storage of the illustrative embodiments removes the restrictions of prior art shared external storage solutions. In the illustrative embodiments described herein, the ratio is handled by the structured external storage with no knowledge on behalf of the client. In addition, the correct ratio is maintained at all times, even in small structures. The shared external storage of the illustrative embodiments completely removes the burden of object ratio management from the client.

More specifically, all free objects within the structure are of the same type (allocation unit). The actual location of every object within the structure is calculated before the structure is allocated. This calculation is done whether or not the structure is to be allocated. That means that the predicted structure properties (size and counts) are guaranteed to be identical to the actual structure properties.

Instead of dividing the storage up into different object types, the shared external storage (SES) of the illustrative embodiments divides the storage into fixed size blocks known as allocation units. To create an object of a special type, the SES uses some predetermined number of allocation units for that type. The SES need only modify a few fields to initialize the object and change its type. If the object fits into one allocation unit, then the SES uses one allocation unit. If the object is larger than one allocation unit, then the SES chains the appropriate number of allocation units together to contain all of the information in the required object.

When an object so allocated is no longer needed, the SES breaks the object down into a set of one or more fixed size allocation units and returns the resulting allocation unit(s) to the pool of available objects. In this manner, the ratio between object types constantly changes as objects are created and destroyed. The SES does not require explicit ratio management.

The SES allocates structures in two phases. In the first phase, the SES calculates the location of every object within the structure before any storage is allocated. In the second phase, the SES allocates the storage and uses the results of the calculations in the first phase to place all of the objects within the structure. If the client requests only a preview of the results of the allocation, then the SES performs only the first phase and returns the results to the client. If the client requests structure allocation, then the SES performs both phases. This means that the results of the preview operation are guaranteed to be identical to the results of the allocation operation.

The SES allocates memory within the storage in fixed units called "frames." A frame may have several fixed objects that must be allocated within each structure, such as a hash table, all allocation units, or a combination of a hash table and allocation units. The size of the frames is known before any memory is allocated. This means that each such object can be assigned to a particular frame and offset within that frame, and the list of frame numbers and offsets can be created before any memory is allocated.

The SES stores the dynamically allocated objects (i.e. allocation units) in two locations. The SES may place some of the allocation units in free space within frames holding other fixed objects. Again, SES stores the frame number and offset within each frame in a list before any memory is allocated. The SES fills remaining frames of the structure entirely with allocation units. As such, no list of the frame numbers and offsets is required as each frame holds the same number of allocation units.

In this manner, a relatively short list of frame numbers and offsets can describe the location of every object within the structure before any memory is allocated. Because these calculations take place before the memory is allocated, these calculations can be used to predict the exact size and object count for any particular lock structure within the SES.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 7 provides a flowchart outlining example operations of a shared external storage with automatic reallocation of storage structures for a requested lock in a lock data structure in accordance with an illustrative embodiment. The shared external storage (SES) partitions the storage into allocation units of equal size and generates a free list of allocation units. Operation begins, and a client requests a lock (block 702). The global lock manager (GLM) within the SES hashes the lock name (block 704) and uses the hash to index into the hash table (block 706).

The GLM determines whether a lock entry is found for the requested lock (block 708). If the client requests a lock about which the GLM holds no information, the GLM allocates a lock entry by converting an allocation unit into a lock entry and creating an entry in the hash table to point to the lock entry (block 710). The GLM then records the lock information in the lock entry (block 712). The GLM allocates a client entry by converting two or more allocation units into a client entry and updates the lock entry to point to the client entry (block 714). The GLM then records the client interest in the lock in the client entry (block 716). Thereafter, operation ends.

If the GLM finds a lock entry for the requested in block 708, the GLM determines whether the client currently holds an interest in the lock (block 718). If the client requests a lock in which it currently holds no interest but some other client does hold interest, then the GLM allocates a client entry by converting two or more allocation units into a client entry (block 720). The GLM then records the client interest in the lock in the client entry (block 722). Thereafter, operation ends.

If the GLM determines that the client already holds an interest in the lock in block 718, the GLM does not have to allocate any storage. Thus, the GLM updates the client interest in the lock in the existing client entry (block 724). Thereafter, operation ends.

Although not shown, if a client no longer has interest in a lock, the GLM may remove the client entry by converting the client entry into two or more allocation units. If no clients hold interest in a lock, the GLM will remove the lock entry by converting the lock entry into an allocation unit.

In addition, although not shown in FIG. 7, a request for a lock may result in a failure. The GLM decides whether or not the client may hold the lock in the mode requested. For example, the client may request lock x in mode q. The GLM records this request and then looks at the entire lock state (all of the client entries) and decides the answer to the original client request. The GLM then returns the answer to the client. If the GLM does not have enough storage to record the request then the response is to deny the request because the GLM cannot record the request. As another example, when the GLM determines that a lock entry is needed, the GLM attempts to allocate both the client entry and the lock entry at the same time. If there are not enough allocation units to allocate both, the request fails.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for automatic reallocation of shared external storage structures. The shared external storage divides the dynamically allocable storage into fixed sized blocks referred to as allocation units. To create an object of a specific type, the shared external storage uses some number of allocation units. If the object will fit in one allocation unit, then it is placed in one allocation unit. If the object is larger than one allocation unit, then the appropriate number of allocation units is obtained and chained together to contain all of the information of the required object. When an object so allocated is no longer needed, the shared external storage breaks the object down to a set of one or more fixed sized allocation units. The shared external storage then returns the allocation units to the pool of available objects. In this manner, the ratio of object types is consistently changing as objects are created and destroyed. No explicit ratio management is required.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a shared external storage device, for automatic allocation of shared external storage structures, the method comprising:
    dividing dynamically allocable storage within the shared external storage device into a plurality of fixed sized allocation units;
    generating a free list of the allocation units;
    responsive to receiving a request for a lock from a client, wherein the request requires allocation of a lock entry for the lock and a client entry for the client, removing an allocation unit from the free list, converting the allocation unit into the lock entry, removing two or more allocation units from the free list, and converting the two or more allocation units into the client entry;
    recording lock information for the lock in the lock entry; and
    recording, in the client entry, client interest in the lock.

2. The method of claim 1, further comprising:
    responsive to a determination that the lock entry is no longer needed, converting the lock entry into an allocation unit and returning the allocation unit to the free list.

3. The method of claim 1, wherein removing two or more allocation units from the free list and converting the two or more allocation units into an object of the second type comprises:
    removing two allocation units from the free list and converting the two allocation units into a single client entry object.

4. The method of claim 1, wherein removing two or more allocation units from the free list and converting the two or more allocation units into an object of the second type comprises:

removing two allocation units from the free list and converting the two allocation units into a client entry object and a client history object, wherein the client entry object and the client history object point to each other.

5. The method of claim 1, further comprising:
modifying the lock entry to point to the client entry.

6. The method 1, further comprising:
responsive to a determination that the client entry is no longer needed, converting the client entry into two allocation units and returning the two allocation units to the free list.

7. A computer program product comprising a non-transitory computer readable storage medium having a computer readable program stored therein, wherein the computer readable program, when executed on a shared external storage device, causes the shared external storage device to:

divide dynamically allocable storage within the shared external storage device into a plurality of fixed sized allocation units;

generate a free list of allocation units;

responsive to receiving a request for a lock from a client of the shared external storage device, wherein the request requires allocation of a lock entry for the lock and a client entry for the client, remove an allocation unit from the free list, convert the allocation unit into the lock entry, remove two or more allocation units from the free list, an convert the two or more allocation units into the client entry;

record lock information for the lock in the lock entry; and
record, in the client entry, client interest in the lock.

8. The computer program product of claim 7, wherein removing two or more allocation units from the free list and converting the two or more allocation units into an object of the second type comprises:

removing two allocation units from the free list and converting the two allocation units into a single client entry object.

9. The computer program product of claim 7, wherein removing two or more allocation units from the free list and converting the two or more allocation units into an object of the second type comprises:

removing two allocation units from the free list and converting the two allocation units into a client entry object and a client history object, wherein the client entry object and the client history object point to each other.

10. The computer program product of claim 7, wherein the computer readable program further causes the shared external storage device to:

modify the lock entry to point to the client entry.

11. The computer program product of claim 7, wherein the computer readable program further causes the shared external storage device to:

responsive to a determination that the lock entry is no longer needed, convert the lock entry into an allocation unit and return the allocation unit to the free list.

12. The computer program product of claim 7, wherein the computer readable program further causes the shared external storage device to:

responsive to a determination that the client entry is no longer needed, convert the client entry into two allocation units and return the two allocation units to the free list.

13. A shared external storage device, comprising:
a processor; and
a memory coupled to the processor, wherein the memory comprises instructions which, when executed by the processor, cause the processor to:

divide dynamically allocable storage within the shared external storage device into a plurality of fixed sized allocation units;

generate a free list of the allocation units;

responsive to receiving a request for a lock from a client of the shared external storage device, wherein the request requires allocation of a lock entry for the lock and a client entry for the client, remove an allocation unit from the free list, convert the allocation unit into the lock entry, remove two or more allocation units from the free list, and convert the two or more allocation units into the client entry;

record lock information for the lock in the lock entry; and
record, in the client entry, client interest in the lock.

14. The shared external storage device of claim 13, wherein the instructions further cause the processor to:

responsive to a determination that the lock entry is no longer needed, convert the lock entry into an allocation unit and return the allocation unit to the free list.

15. The shared external storage device of claim 13, wherein removing two or more allocation units from the free list and converting the two or more allocation units into an object of the second type comprises:

removing two allocation units from the free list and converting the two allocation units into a single client entry object.

16. The shared external storage device of claim 13, wherein removing two or more allocation units from the free list and converting the two or more allocation units into an object of the second type comprises:

removing two allocation units from the free list and converting the two allocation units into a client entry object and a client history object, wherein the client entry object and the client history object point to each other.

17. The shared external storage device of claim 13, wherein the instructions further cause the processor to:

modify the lock entry to point to the client entry.

18. The shared external storage device of claim 13, wherein the instructions further cause the processor to:

responsive to a determination that the client entry is no longer needed, convert the client entry into two allocation units and return the two allocation units to the free list.

* * * * *